(12) United States Patent
Miao

(10) Patent No.: US 8,289,956 B2
(45) Date of Patent: Oct. 16, 2012

(54) COMMUNICATING TONE INFORMATION IN A NETWORK

(75) Inventor: Kai Miao, Boonton Township, NJ (US)

(73) Assignee: Intel Corporation, Santa Clara, CA (US)

( * ) Notice: Subject to any disclaimer, the term of this patent is extended or adjusted under 35 U.S.C. 154(b) by 1375 days.

(21) Appl. No.: 10/213,894

(22) Filed: Aug. 6, 2002

(65) Prior Publication Data

US 2004/0028039 A1 Feb. 12, 2004

(51) Int. Cl.
*H04L 12/66* (2006.01)
*H04L 12/56* (2006.01)

(52) U.S. Cl. ........................................ 370/356; 370/401
(58) Field of Classification Search .................. 370/389, 370/394, 395.21, 401, 493, 495, 351–357
See application file for complete search history.

(56) References Cited

U.S. PATENT DOCUMENTS

| | | | |
|---|---|---|---|
| 6,357,028 B1 * | 3/2002 | Zhu | 714/751 |
| 6,735,213 B2 * | 5/2004 | Speciner | 370/412 |
| 6,961,424 B1 * | 11/2005 | Vialle et al. | 379/418 |
| 2004/0001482 A1 * | 1/2004 | Yeom | 370/356 |
| 2004/0008667 A1 * | 1/2004 | Michaelis | 370/352 |
| 2004/0228325 A1 | 11/2004 | Michaelis | |
| 2006/0083220 A1 * | 4/2006 | Mekala et al. | 370/352 |

FOREIGN PATENT DOCUMENTS

| | | |
|---|---|---|
| EP | 0 946 034 A2 | 9/1999 |
| WO | 2001/028256 A1 | 4/2001 |
| WO | WO 01/28256 A1 | 4/2001 |

OTHER PUBLICATIONS

Schulzrinne et al. RFC 2833—RTP Payload for DTMF Digits, Telephony Tones and Telephony Signals, May 2000.*
C. Perkins et al., "RTP Payload for Redundant Audio Data," Network Working Group, Request for Comments: 2198, Category: Standards Track, Sep. 1997, pp. 1-11, XP: 002259979.
Schulzrinne et al., "RTP Payload for Dtmf Digits, Telephony Tones and Telephony Signals," Internet Engineering Task Force, Internet-Draft, Jun. 9, 1999, pp. 1-15, XP: 002209265.
Second Office Action Mailed Mar. 15, 2010, European Patent Application No. 03767073.4.

* cited by examiner

*Primary Examiner* — Michael Thier
*Assistant Examiner* — Feben M Haile
(74) *Attorney, Agent, or Firm* — Kacvinsky Daisak, PLLC

(57) ABSTRACT

A method and apparatus to communicate tones is described.

19 Claims, 4 Drawing Sheets

300

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X|   CC    |M|     PT      |       sequence number        |
| 2 |0|0|   0     |0|     96      |              28              |
+-+-+-+-+-+-+-+-+-+-+-+-+-+-+-+-+-+-+-+-+-+-+-+-+-+-+-+-+-+-+-+-+
|                           timestamp                            |
|                             11200                              |
+-+-+-+-+-+-+-+-+-+-+-+-+-+-+-+-+-+-+-+-+-+-+-+-+-+-+-+-+-+-+-+-+
|             synchronization source (SSRC) identifier           |
|                            0x5234a8                            |
+-+-+-+-+-+-+-+-+-+-+-+-+-+-+-+-+-+-+-+-+-+-+-+-+-+-+-+-+-+-+-+-+
|F|   block PT   |     timestamp offset    |    block length     |
|1|      97      |          11200          |         4           |
+-+-+-+-+-+-+-+-+-+-+-+-+-+-+-+-+-+-+-+-+-+-+-+-+-+-+-+-+-+-+-+-+
|F|   block PT   |     timestamp offset    |    block length     |
|1|      97      |     11200 - 6400 = 4800 |         4           |
+-+-+-+-+-+-+-+-+-+-+-+-+-+-+-+-+-+-+-+-+-+-+-+-+-+-+-+-+-+-+-+-+
|F|   Block PT   |
|0|      97      |
+-+-+-+-+-+-+-+-+-+-+-+-+-+-+-+-+-+-+-+-+-+-+-+-+-+-+-+-+-+-+-+-+
|     digit      |E R|   volume   |          duration            |
|       9        |1 0|     7      |            1600              |302
+-+-+-+-+-+-+-+-+-+-+-+-+-+-+-+-+-+-+-+-+-+-+-+-+-+-+-+-+-+-+-+-+
|     digit      |E R|   volume   |          duration            |
|       1        |1 0|    10      |            2000              |304
+-+-+-+-+-+-+-+-+-+-+-+-+-+-+-+-+-+-+-+-+-+-+-+-+-+-+-+-+-+-+-+-+
|     digit      |E R|   volume   |          duration            |
|       1        |0 0|    20      |            400               |306
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X|  CC   |M|     PT      |       sequence number         |
| 2 |0|0|   0   |0|     96      |              28               |
+-+-+-+-+-+-+-+-+-+-+-+-+-+-+-+-+-+-+-+-+-+-+-+-+-+-+-+-+-+-+-+-+
|                           timestamp                           |
|                             11200                             |
+-+-+-+-+-+-+-+-+-+-+-+-+-+-+-+-+-+-+-+-+-+-+-+-+-+-+-+-+-+-+-+-+
|           synchronization source (SSRC) identifier            |
|                           0x5234a8                            |
+-+-+-+-+-+-+-+-+-+-+-+-+-+-+-+-+-+-+-+-+-+-+-+-+-+-+-+-+-+-+-+-+
|F|   block PT  |     timestamp offset    |    block length     |
|1|     97      |          11200          |          4          |
+-+-+-+-+-+-+-+-+-+-+-+-+-+-+-+-+-+-+-+-+-+-+-+-+-+-+-+-+-+-+-+-+
|F|   block PT  |     timestamp offset    |    block length     |
|1|     97      |    11200 - 6400 = 4800  |          4          |
+-+-+-+-+-+-+-+-+-+-+-+-+-+-+-+-+-+-+-+-+-+-+-+-+-+-+-+-+-+-+-+-+
|F|   block PT  |     timestamp offset    |    block length     |
|0|     97      |    11200 -   40 = 11160 |          4          |
+-+-+-+-+-+-+-+-+-+-+-+-+-+-+-+-+-+-+-+-+-+-+-+-+-+-+-+-+-+-+-+-+
|F|   block PT  |     timestamp offset    |    block length     |
|0|     97      |    11200 -   20 = 11180 |          4          |
+-+-+-+-+-+-+-+-+-+-+-+-+-+-+-+-+-+-+-+-+-+-+-+-+-+-+-+-+-+-+-+-+
|F|   Block PT  |
|0|     97      |
+-+-+-+-+-+-+-+-+-+-+-+-+-+-+-+-+-+-+-+-+-+-+-+-+-+-+-+-+-+-+-+-+
|     digit     |E R|   volume  |            duration           |
|       9       |1 0|     7     |             1600              | 402
+-+-+-+-+-+-+-+-+-+-+-+-+-+-+-+-+-+-+-+-+-+-+-+-+-+-+-+-+-+-+-+-+
|     digit     |E R|   volume  |            duration           |
|       1       |1 0|    10     |             2000              | 404
+-+-+-+-+-+-+-+-+-+-+-+-+-+-+-+-+-+-+-+-+-+-+-+-+-+-+-+-+-+-+-+-+
|     digit     |E R|   volume  |            duration           |
|       1       |0 0|    20     |              300              | 406
+-+-+-+-+-+-+-+-+-+-+-+-+-+-+-+-+-+-+-+-+-+-+-+-+-+-+-+-+-+-+-+-+
|     digit     |E R|   volume  |            duration           |
|       1       |0 0|    20     |              350              | 408
+-+-+-+-+-+-+-+-+-+-+-+-+-+-+-+-+-+-+-+-+-+-+-+-+-+-+-+-+-+-+-+-+
|     digit     |E R|   volume  |            duration           |
|       1       |0 0|    20     |              400              | 410
+-+-+-+-+-+-+-+-+-+-+-+-+-+-+-+-+-+-+-+-+-+-+-+-+-+-+-+-+-+-+-+-+
```

FIG. 4

COMMUNICATING TONE INFORMATION IN A NETWORK

BACKGROUND

Voice over packet (VOP) technology is directed to sending voice signals over a data network. In addition to voice signals, VOP networks must often account for tone signals that may be interleaved with the voice signals. Many systems utilize tone signals to communicate information between the system and a human user, e.g., using Dual Tone Multi-Frequency (DTMF) tones to represent a telephone number. Some systems, however, may need to communicate tone signals using a separate transport mechanism relative to voice signals. Consequently, there may be a need for innovative techniques to process tone signals in a VOP system.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

FIG. 3 (PRIOR ART) illustrates a conventional tone packet created in accordance with the RFC 2833 Specification.

FIG. 4 illustrates a tone packet created in accordance with one embodiment of the invention.

DETAILED DESCRIPTION

Embodiments of the invention may comprise a method and apparatus to communicate tones over a network, such as a VOP network. For example, one embodiment of the invention may be directed to communicating tones in a VOP network in a redundant fashion to mitigate packet loss in the network.

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

It is also worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
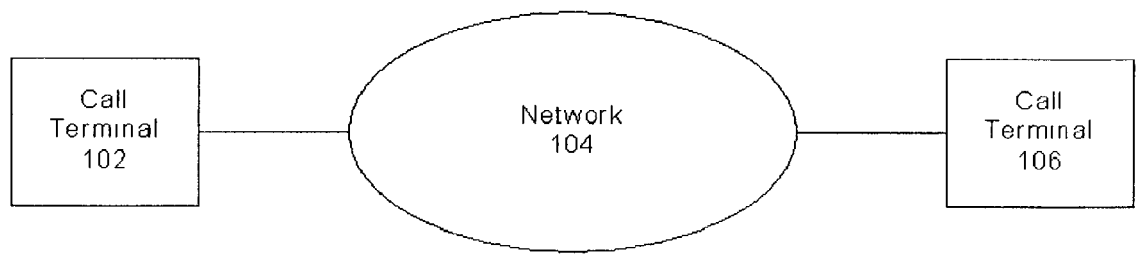
FIG. 1 is a system suitable for practicing one embodiment of the invention.

Referring now in detail to the drawings wherein like parts are designated by like reference numerals throughout, there is illustrated in FIG. 1 a system suitable for practicing one embodiment of the invention. FIG. 1 is a block diagram of a system 100. System 100 may comprise, for example, call terminals 102 and 106 connected by a network 104.

Examples of a call terminal may include any device capable of communicating audio and tone signals over a network. A call terminal may comprise, for example, a conventional telephone set, a wireless telephone, a portable or handheld computer equipped with a transceiver and modem, a personal digital assistant (PDA), a packet telephony telephone and so forth.

Network 106 may comprise, for example, a packet network. In one embodiment of the invention, network 106 may operate in accordance with, for example, one or more Internet protocols such as the Transmission Control Protocol (TCP) as defined by the Internet Engineering Task Force (IETF) standard 7, Request For Comment (RFC) 793, adopted in September, 1981, and the Internet Protocol (IP) as defined by the IETF standard 5, RFC 791, adopted in September, 1981, both available from "www.ictf.org", although the embodiments of the invention are not limited to this context. Network 106 may also operate in accordance with one or more protocols to communicate VOP packets representing audio, voice or tone information. In one embodiment of the invention, for example, network 106 may operate in accordance with the International Telecommunications Union (ITU) Recommendation H.323 titled "Packet-based Multimedia Communication Systems," published in November 2000 and available from "www.itu.int" ("H.323 Specification"); the IETF Proposed Standard RFC 2543 titled "SIP: Session Initiation Protocol," published in March 1999, and available from "www.ietf.org" ("SIP Specification); or IETF Proposed Standard RFC 2833 titled "RTP Payload for DTMF Digits, Telephony Tones and Telephony Signals," published in May 2000, and available from "www.ietf.org" ("RFC 2833 Specification"). Although specific examples are discussed herein, it may be appreciated that the embodiments of the invention are not limited in this context. Further, network 106 may also include circuit-switched technologies and appropriate interfaces to packet network technologies.

Figure 2:
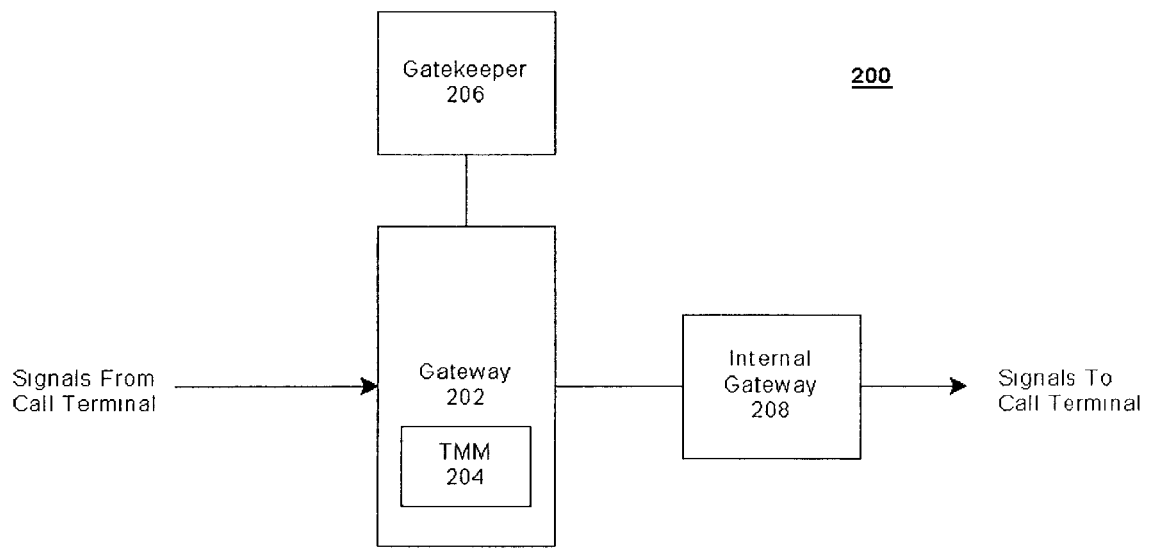
FIG. 2 illustrates a VOP system suitable for use with one embodiment of the invention.

FIG. 2 illustrates a VOP system suitable for use with one embodiment of the invention. FIG. 2 is a block diagram of a system 200. System 200 may comprise part of, for example, system 100 shown in FIG. 1. System 200 may comprise a VOP system, including a gateway 202, a gatekeeper 206 and an internal gateway 208. Gateway 202 may also include a Tone Management Module (TMM) 204.

Gateway 202 may operate to convert a conventional telephony call to a packet telephony call or VOP call. Gateway 202 may receive signals from a circuit-switched network, such as the Public Switched Telephone Network (PSTN), and convert the circuit-switched signals into packets. The conversion to packets may be made in accordance with, for example, the TCP/IP Specification, SIP Specification, H.323 Specification and RFC 2833 Specification. Gateway 202 may communicate the packets through other components of system 200 until the packets reach their intended destination, e.g., a call terminal connected to internal gateway 208.

Gatekeeper 206 may perform conventional gatekeeper functions, such as address translation, admission control, call control signaling, call authorization, call management and so forth in accordance with the SIP Specification or H.323 Specification, for example. In one embodiment of the invention, gatekeeper 206 may provide address and routing information to communicate packets through system 200 to the destination call terminal, such as call terminal 106.

In one embodiment of the invention, gateway 202 may also include TMM 204. TMM 204 may manage the communication of tone signals in a network, such as a VOP network. In one embodiment of the invention, TMM 204 may include functionality that may be implemented as software executed by a processor, hardware circuits or structures, or a combination of both. The processor may be a general-purpose or dedicated processor, such as a processor from the family of processors made by Intel Corporation, Motorola Incorporated, Sun Microsystems Incorporated and others. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic for performing the recited functionality, or by any combination of programmed general-purpose computer components and custom hardware components.

In operation, TMM 204 may detect tone signals received at the gateway, and process the tones in accordance with one or more tone protocols, such as the tone protocol set forth in the RFC 2833 Specification. The RFC 2833 Specification is an Internet standard directed to transporting telephony tones using the Real Time Transport Protocol (RTP). The RFC 2833 Specification outlines that tones sent within an encoded voice stream ("in-band") tend to become corrupted and unrecognizable at a receiver due to high compression rates. If the tones are sent via traditional TCP/IP, however, significant delays may be incurred due to lost packets or the intrinsically lower priority of conventional TCP/IP traffic. The RFC 2833 Specification attempts to address these problems by defining two types of tone RTP packets communicated in accordance with the User Datagram Protocol (UDP). The transport of tone RTP packets over UDP is unreliable, however, and may still result in losing enough packets to render the receiver incapable of using the tone information.

In an attempt to address this problem, the RFC 2833 Specification describes a redundancy mechanism, where each tone RTP packet not only carries current tone information, but also up to five previous tone events. The term "tone information" as used herein may refer to any information used to represent tone signals, including names, tags, frequency components, time information, and so forth. The term "tone signals" as used herein may refer to any tone signals, such as DTMF tones or other tones used by telephony, VOP or automated systems. The term "tone packets" as used herein may refer to any packet used to carry tone information.

In accordance with the RFC 2833 Specification, the tone packets may include two types of tone information. The first type is tone information representing a current tone event, which may be referred to herein for convenience as "Type One Information." The second type is tone information representing a previous tone event, which may be referred to herein for convenience as "Type Two Information." The term "tone event" as used herein refers to a complete tone signal, e.g., starting time, duration and ending time. In one embodiment of the invention, system 200 may use Type Two Information for redundancy. In the situation where packets carrying a previous tone event are lost, Type Two Information may be used to reconstruct the previous tone event.

Type Two Information, however, may not provide sufficient redundancy in certain cases. For example, a tone event typically lasts longer than the packet or frame size used to transport tone information. Consequently, a VOP system may need to begin transport of Type One Information before the current tone event has been completed. If such packets are corrupted or lost prior to completion of the tone event, the receiver may not have sufficient information to reconstruct the tone event. The redundancy functionality of the Type Two Information would not be useful in this case, since it carries tone information from a previous tone event, and not the current tone event.

In an attempt to solve this and other problems, one embodiment of the invention may utilize a third type of tone information, which may be referred to herein for convenience as "Type Three Information." Type Three Information may comprise, for example, partial tone information of a current tone event. For example, Type Three Information may be tone information for a current tone event carried by one or more previous packets or frames. In this manner, if one or more packets carrying Type One Information are lost, a receiver may be able to reconstruct the current tone event in a timely manner using the Type Three Information. As stated previously, the redundancy functionality of Type Two Information would not be useful in this case, since it carries tone information from a previous tone event. Type Three Information, however, may be received in sufficient time to be detected and used by the VOP or automated system. This embodiment of the invention may be better illustrated with reference to FIGS. 3 and 4 below.

FIG. 3 (PRIOR ART) illustrates a conventional tone packet created in accordance with the RFC 2833 Specification. FIG. 3 illustrates a typical RTP packet 300, where the user is just dialing the last digit of the DTMF sequence "911." The first digit was 200 milliseconds (ms) long (1600 timestamp units) and started at time 0, the second digit lasted 250 ms (2000 timestamp units) and started at time 800 ms (6400 timestamp units), the third digit was pressed at time 1.4 seconds (11,200 timestamp units). Packet 300 illustrates that it was sent at 1.45 seconds (11,600 timestamp units). The frame duration is 50 ms long. It is worthy to note that FIG. 3 ignores byte alignment for purposes of this illustration. Timestamp and sequence number are assumed to have been zero at the beginning of the first digit. As shown in FIG. 3, RTP tone packet 300 includes Type Two Information for redundancy. For example, elements 302 and 304 indicate the previous tone events for "9" and "1", respectively. While the Type Two Information may be useful for reconstructing the previous tone events for "9" and "1", this information would not be helpful to reconstruct the current tone event for the last digit "1" that is still active.

FIG. 4 illustrates a tone packet created in accordance with one embodiment of the invention. FIG. 4 illustrates an RTP packet 400. Similar to RTP packet 300, RTP packet 400 indicates three tone events generated by a caller. The three tone events are the DTMF tones "9", "1" and "1". The first tone was pressed at time 0 with a duration of 1600 ms. The second tone was pressed at time 6400 ms with a duration of 2000 ms. The third tone was pressed at time 11200 ms, but has not ended. Rather, the third tone event is only 400 ms into the total tone event. Elements 402 and 404 represent tone information for the previous tone events "9" and "1" for redundancy. In accordance with one embodiment of the invention, however, RTP packet 400 may also include Type Three Information in the form of tone information from two previous tone packets, shown in FIG. 4 as elements 406 and 408, respectively. These two previous tone frames are the two previous tone frames just prior to the current or most recent tone frame, shown in FIG. 4 as element 410.

In accordance with one embodiment of the invention, if the tone packets carrying the tone information represented as redundant elements 406 and 408 were lost in transport, the intended receiver may use elements 406 or 408 from RTP tone packet 400 to reconstruct the third tone event of "1" in the "911" sequence.

In one embodiment of the invention, TMM 204 may create a tone packet similar to RTP tone packet 400 described with respect to FIG. 4. The embodiment may include current tone information, as well as tone information carried by one or more previous packets. In this manner, a receiver may recover tone information in the event one or more packets are lost or corrupted during transmission. This is an improvement over conventional tone management techniques, which are typically based on tone event management rather than tone packet management.

The operations of systems 100 and 200 may be further described with reference to FIG. 5 and accompanying examples. Although FIG. 5 as presented herein may include a particular processing logic, it can be appreciated that the processing logic merely provides an example of how the general functionality described herein can be implemented. Further, each operation within a given processing logic does not necessarily have to be executed in the order presented unless otherwise indicated.

Figure 5:
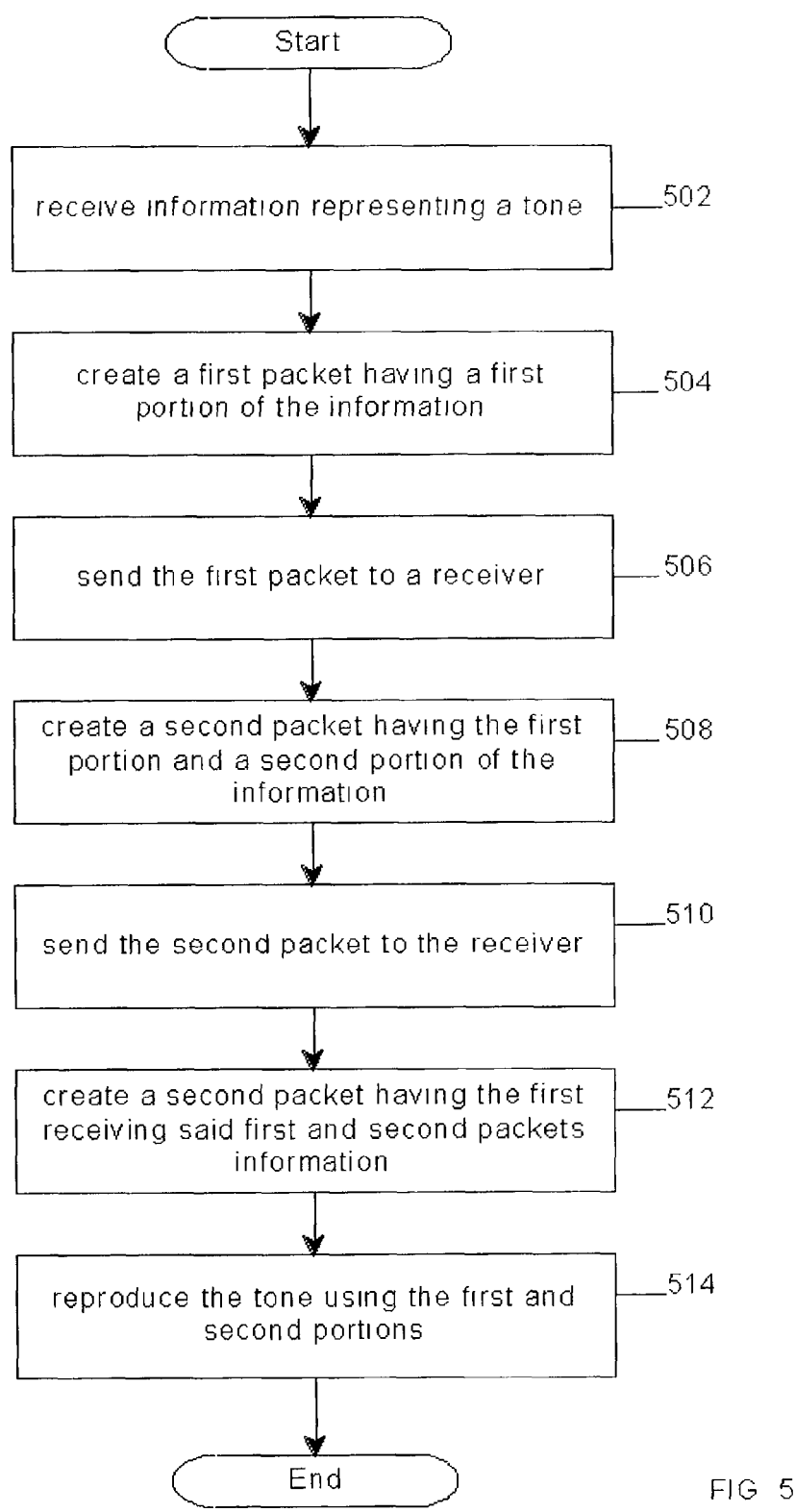
FIG. 5 is a block flow diagram of the operations performed by a TMM in accordance with one embodiment of the invention.

FIG. 5 is a block flow diagram of the operations performed by a TMM in accordance with one embodiment of the invention. In one embodiment of the invention, this or other modules may refer to the software and/or hardware used to implement the functionality for one or more embodiments as described herein. In this embodiment of the invention, this or other modules may be implemented as part of a system, such as system 200. It can be appreciated that this functionality, however, may be implemented by any device, or combination of devices, located anywhere in a communication network and still fall within the scope of the invention.

FIG. 5 illustrates a programming logic 500 for a TMM in accordance with one embodiment of the invention. As shown in programming logic 500, tone information may be received at block 502. In one embodiment of the invention, the tone information may represent DTMF signals, for example. A first packet having a first portion of the tone information may be created at block 504. The first packet may be sent to a receiver at block 506. A second packet having the first portion and a second portion of the information may be created at block 508. The second packet may be sent to the receiver at block 510. The first and second packets may be received at block 512. The receiver may reproduce the tone using the first and second portions of tone information at block 514.

In one embodiment of the invention, the first and second packets may be created in accordance with, for example, the RFC 2833 Specification as modified using the concepts presented herein. More particularly, the packets may be RTP tone packets, with the tone information represented as a name for the tone or a frequency for the tone. In one embodiment of the invention, the frequency and/or duration of the tone may be ascertained and used to search for a corresponding name or event in a table or memory. For example, a tone signal representing a DTMF digit may be received. The TMM may receive the tone signal and search a database for a name corresponding to one or more characteristics of the tone signal, e.g., the frequency. The TMM may create the tone packet and use the name as the identifier for the tone signal. In another embodiment of the invention, the TMM may pass one or more characteristics of the tone signal in the tone packet, e.g., the frequency itself.

The operation of systems 100 and 200, and the processing logic shown in FIG. 5, may be better understood by way of example. Assume a caller uses call terminal 104 to initiate a telephone call to call terminal 106 via network 104. The caller dials the 10 digit telephone number that is received by network 104. Network 104 initiates call setup using conventional circuit-switched technology via the PSTN and sends the 10 DTMF digits. The circuit-switched signals are received by gateway 202 of system 200. Gateway 202 includes PSTN interface cards and technology to convert the circuit-switched signals to packet-switched signals. TMM 204 of gateway 202 detects the DTMF signals and begins creating RTP tone packets in accordance with the RFC 2833 Specification and the modifications described herein. The RTP tone packets are routed to call terminal 106 via routing information obtained via gatekeeper 206.

In accordance with one embodiment of the invention, the RTP tone packets include redundant information in the event one or more RTP tone packets are corrupted or lost during transport to call terminal 106. The RTP tone packets may resemble, for example, RTP tone packet 400 described with reference to FIG. 4. As discussed previously, RTP tone packet 400 may include conventional Type Two Information regarding previous tone events, e.g., previously dialed DTMF digits. In accordance with one embodiment of the invention, RTP tone packet 400 may also include Type Three Information as well. It may be appreciated that in some implementations, the Type Two Information may be omitted from RTP tone packet 400 in accordance with bandwidth or other design constraints of network 104.

In accordance with one embodiment of the invention, call terminal 106 may begin receiving RTP tone packets from gateway 202. Call terminal 106 may attempt to reconstruct a tone event using the RTP tone packets. In the event one or more RTP tone packets are lost, call terminal 106 may use the Type Three Information to retrieve information carried by the corrupted or lost packets.

Since the RFC 2833 Specification already defines up to five levels of redundancy, it can be appreciated that the Type Three Information may be inserted into RTP tone packets using one or more of these five levels. In this manner, TMM 204 offers more robust and resilient tone recovery functionality while adding relatively little overhead or latency, and in some cases, no overhead or latency at all. It may also be appreciated that the RTP packets may be constructed using any combination of Type Two Information and Type Three Information that meets the design or performance constraints of a particular system.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to communicate tones, comprising:
    receiving information representing a tone;
    creating a first packet having a first portion of said information representing a current tone event;
    sending said first packet to a receiver;
    creating a second packet having said first portion of said information, a second portion, and a third portion of said information, wherein said second portion includes information representing a previous tone event, and said third portion of said information includes partial tone information of said current tone event carried by said first packet, said partial tone information of said current tone event includes time information; and sending said second packet to said receiver.

2. The method of claim 1, wherein said information represents a dual tone multi-frequency digit.

3. The method of claim 1, wherein creating said first packet and said second packet is accomplished in accordance with RFC 2833.

4. The method of claim 1, wherein sending said first packet and said second packet is accomplished in accordance with the RTP protocol.

5. The method of claim 1, wherein said information represents a name for said tone.

6. The method of claim 1, wherein said information represents a frequency for said tone.

7. A method to communicate tones, comprising:
receiving a first packet having a first portion of information representing a current tone event; and
receiving a second packet having said first portion of said information, a second portion, and a third portion of said information, wherein said second portion includes information representing a previous tone event, and said third portion of said information includes partial tone information of said current tone event carried by said first packet, said partial tone information of said current tone event includes time information.

8. The method of claim 7, further comprising reproducing said tone using said first and second portions.

9. The method of claim 7, wherein said information represents a dual tone multi-frequency digit.

10. The method of claim 7, wherein said first packet and said second packet are created in accordance with RFC 2833.

11. The method of claim 7, wherein said first packet and said second packet are received in accordance with the RTP protocol.

12. The method of claim 7, wherein said information represents a name for said tone.

13. The method of claim 7, wherein said information represents a frequency for said tone.

14. A method to communicate tones, comprising:
receiving information representing a tone;
creating a first packet having a first portion of said information representing a current tone event;
sending said first packet to a receiver;
creating a second packet having said first portion of said information, a second portion, and a third portion of said information, wherein said second portion includes information representing a previous tone event, and said third portion of said information includes partial tone information of said current tone event carried by said first packet, said partial tone information of said current tone event includes time information;
sending said second packet to said receiver;
receiving said first and second packets; and
reproducing said tone using said first and third portions.

15. The method of claim 14, wherein said information represents a dual tone multi-frequency digit.

16. An article of manufacture for communicating tone information including a non-transitory computer readable storage medium having instructions stored thereon, that when executed by a processor result in:
receiving information representing a tone, creating a first packet having a first portion of said information representing a current tone event, sending said first packet to a receiver;
creating a second packet having said first portion and a second portion, and a third portion of said information, wherein said second portion includes information representing a previous tone event, and said third portion of said information includes partial tone information of said current tone event carried by the first packet, said partial tone information of said current tone event includes time information, and
sending said second packet to said receiver.

17. The article of claim 16, wherein the stored instructions, when executed by a processor, further result in receiving said first and second packets, and reproducing said tone using said first and second portions.

18. A system, comprising:
a computing platform adapted to communicate tones;
said platform being further adapted to receiving information representing a tone;
creating a first packet having a first portion of said information representing a current tone event, sending said first packet to a receiver, creating a second packet having said first portion of said information, a second portion, and a third portion of said information, wherein said second portion includes information representing a previous tone event, and said third portion of said information includes partial tone information of said current tone event carried by said first packet, said partial tone information of said current tone event includes time information, and sending said second packet to said receiver.

19. The system of claim 18, wherein said platform is further adapted to receiving said first and second packets, and reproducing said tone using said first and second portions.

* * * * *